United States Patent [19]

Wedemeyer et al.

[11] Patent Number: 5,159,864

[45] Date of Patent: Nov. 3, 1992

[54] INSERT FOR A TABLE SAW

[76] Inventors: Arlan B. Wedemeyer, 15034 NE. 172nd Ave., Brush Prairie, Wash. 98606; Joseph B. Wedemeyer, 29010 NE. 164th Ave., Battleground, Wash. 98604

[21] Appl. No.: 763,971

[22] Filed: Sep. 23, 1991

[51] Int. Cl.$^5$ .............................. B27B 5/20
[52] U.S. Cl. ............................ 83/13; 83/471.2; 83/477.1; 83/477.2
[58] Field of Search ............ 83/13, 477.2, 471, 477.1, 83/471.2, 477; 144/286 R, 286 A

[56] References Cited

U.S. PATENT DOCUMENTS

| | | | |
|---|---|---|---|
| 2,709,463 | 5/1955 | Gustin | 83/477.2 |
| 3,269,433 | 8/1966 | Packard et al. | 83/477.2 |
| 3,285,303 | 11/1966 | Kwiatkowski | 83/477.2 |
| 3,386,482 | 6/1968 | Nadeau | 83/477.1 |
| 4,161,900 | 7/1979 | Mendelsohn | 83/409 |

Primary Examiner—Frank T. Yost
Assistant Examiner—Kenneth E. Peterson
Attorney, Agent, or Firm—Klarquist, Sparkman, Campbell, Leigh and Whinston

[57] ABSTRACT

An improved slot device for use with a table saw is provided. A throat plate having an enlarged central opening straddled by a dove-tailed groove into which a wood insert slidingly fits presents a slot through which the table saw blade may project with minimal clearance when the blade is raised for operation with the throat plate mounted in place.

7 Claims, 1 Drawing Sheet

U.S. Patent          Nov. 3, 1992          5,159,864
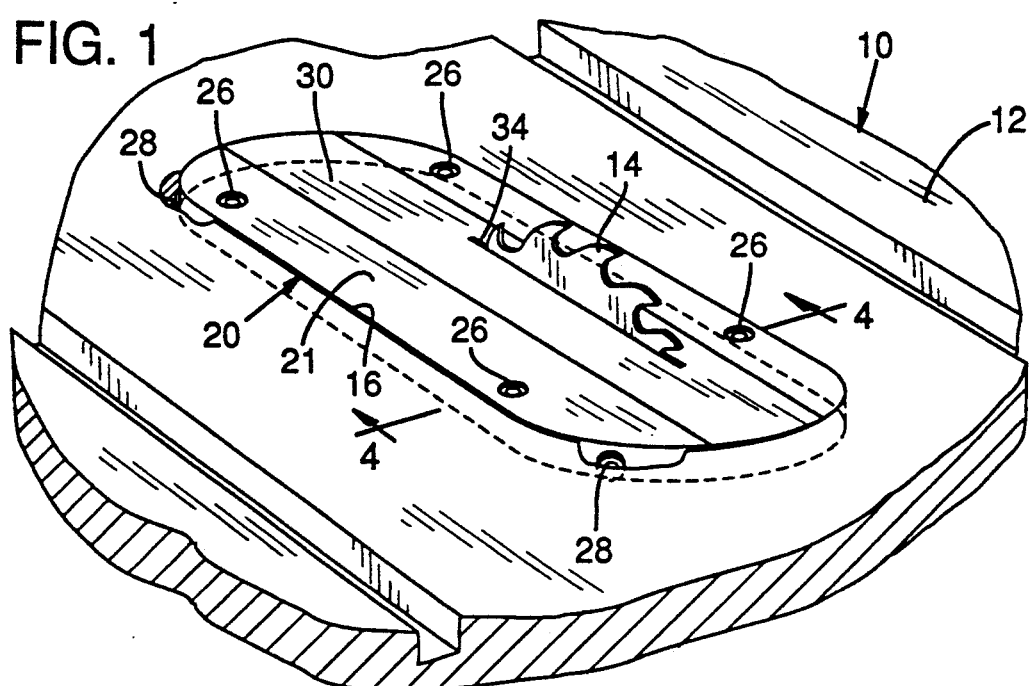
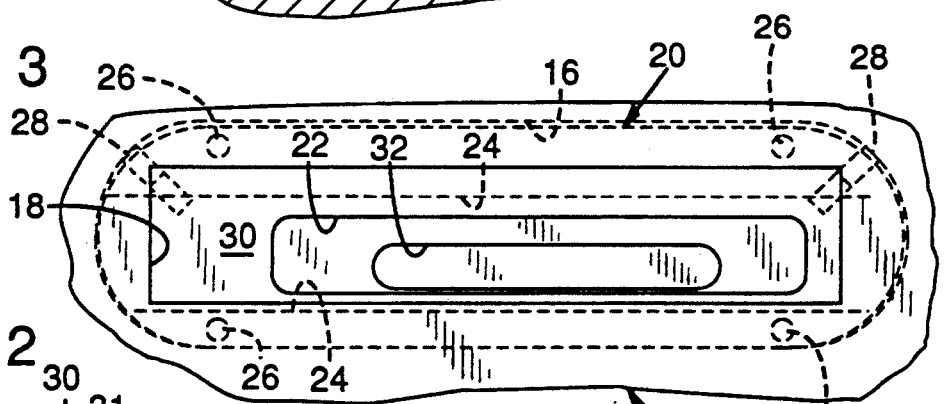
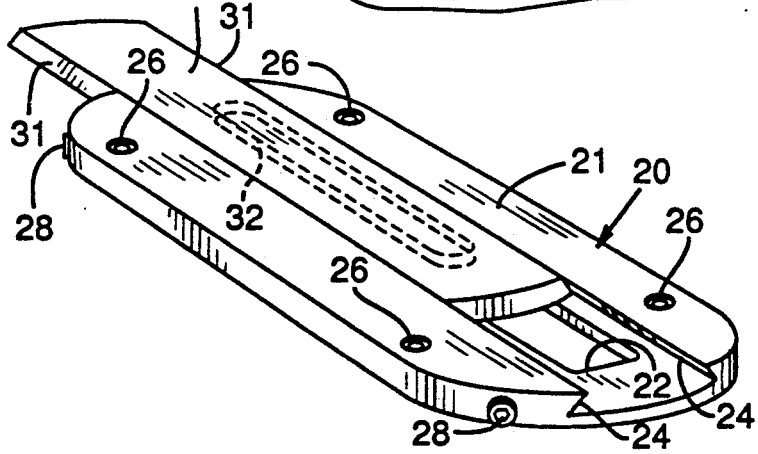
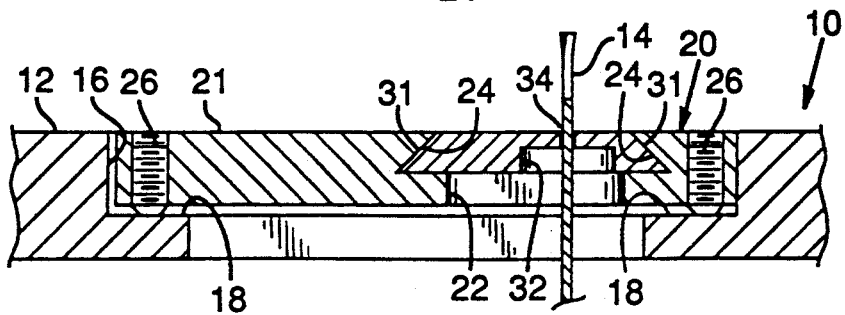

INSERT FOR A TABLE SAW

FIELD OF THE INVENTION

The invention relates generally to a table saw and more particularly to an improved slotted plate for a table saw.

BACKGROUND OF THE INVENTION

The table saw is an apparatus in general use for making cuts in a wood workpiece. The table saw conventionally consists of a flat table-like work surface upon which the workpiece rests and a powered, rotating circular saw blade mounted in such a manner that the blade may be raised to project upwardly through a slot in the work surface. The table saw operator can then make cuts in the workpiece by moving the workpiece over the work surface to engage the saw blade.

Typically, a table saw is equipped to accept a variety of blades which are suitable for performing differing cuts in a workpiece. For example, most table saws are equipped to allow the interchange of at least a saw blade for cutting a workpiece in two, and a dado blade for making a grooved cut in a workpiece.

In order to accommodate the various blades, however, it is also necessary to provide a means to furnish a different slot in the work surface for each blade due to the differing cross-sectional shape of the blades. Only a very wide slot in the work surface would accommodate all types of blades, and such a slot would not adequately support the workpiece near the blade. Many such slotting arrangements are known.

One conventional solution is to instead provide a recessed opening in the work surface in which a throat plate, having the correctly shaped slot for the blade being used, may be mounted. When mounted in the recessed opening, the throat plate forms a planar surface with the work surface and provides a slot through which the blade may be projected. By changing the throat plate whenever the blade is changed, an appropriately shaped slot for each blade is furnished. These throat plates are conventionally made of metal.

One disadvantage of the conventional throat plate arrangement is that the slots in the metal plates are usually of substantially greater width than the blade to avoid contact between the plate and the teeth of the blade. However, because the workpiece supported on the work surface is not supported adjacent to the blade edge, rough cutting of the work may result.

Maier, et al, U.S. Pat. No. 4,543,866, discloses a slotting arrangement in which a metal cover plate is provided having a slot of sufficient dimensions to accommodate blades of different designs and prevent contact between the cover plate and the blade when in operation. The cover plate is provided with teeth for positioning and locking the cover plate in a base plate which serves as a work surface of a table saw. This arrangement has the same disadvantages as the conventional throat plate arrangement. Substantial clearance between the cover plate and the blade is maintained, resulting in rough cutting of a workpiece.

Mendelsohn, U.S. Pat. No. 4,161,900, discloses a veneer edging jig consisting of an upper and lower clamp plate for gripping a stack of veneer sheets therebetween such that a portion of the veneer sheets projects outwardly from matching edges of the clamp plates. The clamp plates are made of metal with their matching edges formed of wood. The portion of the veneer sheets may be cut by first, placing the jig and veneer sheets on a standard table saw having a flat table surface and vertical circular saw blade projecting through a slot therein. The matching edges of the jig plates are then aligned longitudinally with the saw blade before moving the plates over the table surface with the matching edges flush against the blade. In this manner, the workpiece is supported adjacent to the blade during a cutting operation without changing the conventional throat plate slotting arrangement. A disadvantage of the edging jig arrangement, however, is the bulk of the apparatus and the need to install it on a workpiece before each cut.

In Gustin, U.S. Pat. No. 2,709,463, an apparatus for forming slots in a wood well cover is disclosed. The well cover is adapted for mounting in a well opening in a work surface of a table saw with the cover resting upon a lip around the opening such that the upper surface of the cover is flush with the work surface. The table saw has a plurality of saw blades rotatably mounted on a mandrel having a stationary axis, with the saw blades projecting vertically through the well opening. The invention consists of a frame mounted to the work surface with hinges to lower the cover over the rotating blades, into the well opening, thereby cutting slots in the cover.

A slot apparatus consisting of a slotted wood well cover, like that disclosed by Gustin, features minimal clearance slots for supporting a workpiece near a saw blade. One drawback to such an apparatus is that the saw operator must expend considerable time and labor to form well covers of the correct dimensions to fit the well opening. A further disadvantage is that such an arrangement may result in considerable waste of wood since an entire wood well cover must be made for each saw blade combination used with the table saw. Also, the wood well cover, as compared to a metal throat plate, is subject to more wear in use and is more difficult to fashion to precise tolerances for fitting snugly in a well opening. Therefore, the wood well cover is more prone to lateral movement within the well opening when subjected to working conditions.

SUMMARY OF THE INVENTION

In accordance with the invention, a metal throat plate with an enlarged central opening is provided for use with a table saw having a flat work surface and a saw blade adapted to project upwardly through a recessed opening in the work surface. A dovetailed groove in the throat plate surrounds the central opening to receive an insert made of wood or plastic or similar material. The insert is shaped to be received in the dovetailed groove and, when fitted in place, forms a planar surface with the top of the throat plate. The throat plate itself is shaped to be received in the recessed opening of the table saw.

An appropriately shaped slot to accommodate a saw blade is formed in the insert by simply raising the blade up through the insert with the insert and throat plate fitted in place in the table saw. Since the insert is made of wood or similar material it may be engaged by the teeth of the blade without damaging the blade. The slot so formed allows the blade to project upwardly above the work surface of the table saw where it can engage and make a cut in a wood workpiece. A slot formed in this manner has minimal clearance between the blade and the insert with the resulting advantage of virtually eliminating any chipping of the workpiece along the cut. Also, by substituting inserts, the throat plate is easily adapted for use with any blade. Thus, only a single throat plate need be maintained to accommodate various blades used with the table saw.

A further advantage of the invention is that the inserts are inexpensive and easily adaptable to any blade. Hence, the inserts may be considered disposable.

A minimal clearance slot offers the further advantage of preventing a workpiece from becoming wedged into the gap between the blade and the insert. This dangerous condition is most likely to occur when making inclined cuts in a small or thin workpiece.

The combination of a metal throat plate with a wood insert also offers advantages over a slotting arrangement consisting of a throat plate made entirely of wood. With the metal throat plate/wood insert combination, only one throat plate need be maintained to accommodate the various blades used with the table saw. Thus, the time and expense of outfitting the table saw with multiple throat plates for various blades is avoided. The metal throat plate is also less prone to wear and may be formed to more precise tolerances to fit snugly in the recessed opening in the table saw. Yet a further advantage is that the insert can be easily and quickly fit into the table saw.

These and other features and advantages of the invention will be apparent from the drawings and detailed description of a preferred embodiment.

BRIEF DESCRIPTION OF THE DRAWINGS

FIG. 1 is a top perspective view of a portion of a table saw having a throat plate formed in accordance with the invention with portions of the table broken away.

FIG. 2 is an enlarged perspective view of a throat plate made in accordance with the invention with an insert partially installed therein.

FIG. 3 is a bottom plan view of a throat plate constructed in accordance with the invention.

FIG. 4 is an enlarged sectional view taken along line 4—4 of FIG. 1.

DETAILED DESCRIPTION OF THE PREFERRED EMBODIMENT

Referring now to the drawings, FIGS. 1 and 4 illustrate a portion of a table saw 10 having a table-top work surface 12 and a powered, vertical circular saw blade 14 projecting upwards through an oblong opening 16 in the work surface. The ends of the opening are semicircular. Around the circumference of the opening 16 is an inwardly protruding lip 18. The blade 14 is mounted to a motor (not shown) in a conventional manner so that it may be raised and lowered with respect to the work surface 12. Thus, the blade may be lowered so as not to project above the work surface 12 or raised into a position as illustrated where a portion of the blade projects above the work surface. The blade 14 is also interchangeable as the table saw 10 may be fitted with different types of blades as may be required. Further details of the table saw 10 are not deemed necessary for a proper understanding of the present invention.

With reference to FIGS. 2 and 3, in accordance with the invention, a throat plate 20 is provided for mounting in the opening 16. In the preferred embodiment, the throat plate 20 comprises an oblong metal base plate 21, preferably constructed of aluminum. The outside shape of the base plate 21 conforms substantially to the configuration of the opening 16 in the table saw 10 of FIG. 1 and when inserted therein is supported on the lip 18 with the top surface of the plate coplanar with the work surface 12.

The throat plate 20 has an enlarged rectangular central opening 22 in the metal plate 21 aligned longitudinally with the plate. A dovetailed groove 24 straddles the central opening 22 and preferably extends the entire length of the plate 21. The throat plate 20 further includes four height adjusting screws 26 and two side adjustment screws 28. The height adjusting screws 26 are set in threaded holes drilled through the metal base plate 21 from the top thereof, two to each side of the groove and positioned over the lip 18. The side adjustment screws 28 are set in threaded holes that have been drilled into the side of the base plate 21. Preferably, the holes for the side adjustment screws are located one at each rounded end of the base plate 21 and extend into the plate from the same side of and substantially at a 45° angle to the longitudinal axis of the plate.

The throat plate 20 also includes an insert 30 which is received in the dovetailed groove 24. In the preferred embodiment, the insert 30 has the same length as the dovetailed groove 24 and the metal base plate 21. However, its width and depth are less than half those of the base plate. The ends of the insert are rounded in shape to match the rounded ends of the base plate. Also, the insert has angled or inclined sides 31 to engage the inwardly angled sides of the dovetailed groove. The insert 30 is constructed of wood or plastic or similar material that may be engaged by the teeth of the blade 14 without damage to the teeth yet still provide the required structural strength to support the workpiece. It is preferred that red oak be used to make the insert 30. However, maple and other hard woods as well as ABS plastic and linen filled phenolic have been found to be acceptable. An oblong recess 32 is provided in the bottom of the insert 30, the utility of which will be apparent later in this description. The recess 32 should extend upwards into the insert almost to the top surface of the insert, leaving, however, enough material between the recess and the top surface of the insert to support a workpiece on the top of the insert. Preferably, the recess is positioned so that an edge is along the adjacent edge of the lip 18, as seen in FIG. 4.

FIG. 2 illustrates the manner in which the insert 30 may be inserted into the dovetailed groove 24. The insert 30 is inserted by sliding it lengthwise into the dovetailed groove 24 from one end of the metal plate 21. When completely installed, the insert 30 completely covers the central opening 22, and the top surfaces of the insert and the metal plate 21 form a planar surface. Means other than a dovetailed groove for receiving and securing the insert may be utilized in practicing the invention. However, in the preferred embodiment, a dovetailed groove 24 is employed due to the ease and quickness with which it may be formed and used to fit the insert in place.

Referring again to FIGS. 1 and 4, the throat plate 20 is shown mounted on the table saw 10. The throat plate 20 may be mounted on the table saw 10 in the following manner. Assuming that a slot 34 in the insert 30 has not yet been formed, it will be necessary to first lower the saw blade 14. The recess 32 in the insert 30 provides extra clearance in the case of a large diameter saw blade that cannot be otherwise sufficiently lowered. The throat plate 20 is then placed into the opening 16 of the table saw 10 to rest on the lip 18. The height adjusting screws 26 are adjusted to align the throat plate's upper surface with the work surface 12. Side adjustment screws 28 should also be adjusted so that the throat plate 20 fits snugly in the opening 16 to minimize or eliminate any lateral movement of the throat plate 20. The side adjustment screws 28 are set diagonally into the metal plate 21 to enable the two screws to adjust for excess clearance both at the sides of the plate 21 and at its ends and to position the throat plate with the opposite longitudinal edge thereof in snug engagement with a longitudinal edge of the throat plate opening 16. Thus, the throat plate if removed and reinserted will be in identical position.

A board is then clamped to the table top 12 so as to overlay the insert 30. The blade 14 is then powered and slowly raised to engage the insert 30 and cut a slot therein, the blade being raised until is protrudes the desired amount above the table top surface 12. By this action, a slot 34 of minimal clearance between the blade and the insert, i.e., only the clearance formed by the set of the blade teeth will be formed. The presence of the board over the insert minimizes any chipping of the edges of the slot 34 formed in the insert. The minimal clearance of the slot 34 is a great advantage over the conventional throat plate slot as the workpiece will be supported by the insert 30 adjacent to the blade during the cutting operation. Thus, chipping of the workpiece along the cut edge is prevented and the danger of wedging a workpiece into the gap between blade and insert is lessened.

An additional safety advantage is available through use of the invention if, when cutting the slot, the blade is raised higher than in a normal cutting operation. The slot so formed still has minimal side clearance, but will be longer in length than the blade when the blade is again lowered to its normal operating height. The longer slot is useful in aligning the workpiece in preparation for cutting since it is indicative of the blade's orientation. Use of the slot for alignment purposes allows the table saw operator to align the workpiece without contact with the blade, keeping his or her fingers and hands clear of the blade.

The longitudinal slot 34 formed in the insert as just described conforms in width to the set width of the teeth of the blade 14. The insert 30 is intended to have only a single slot which accommodates a single size and type of blade. To accommodate different blades used with the table saw, additional inserts similar to the insert 30 may be provided, each having cut therein a different size and shape of slot corresponding to a different type or size of blade. When the table saw 10 is thereafter fitted with one of these other blades in place of the blade 14, the insert 30 may be quickly replaced with another insert having a corresponding slot. In this manner, a correctly shaped slot is always available when the blade is changed. If an insert having a corresponding slot is not available, the appropriate slot may quickly be formed in an unslotted insert as was previously explained. As apparent, the inserts may also be utilized with dado blades.

Having illustrated and described a preferred embodiment of the invention, it will become apparent that the invention permits of modifications in arrangement and detail.

We claim:

1. A throat plate having a top and a bottom surface for use with a table saw comprising a circular saw blade and a table top having an elongated recessed opening in the table top for receiving the throat plate, the throat plate comprising:

an elongated rigid metal base plate having a top surface configured to fit snugly within the recessed opening, said base plate having an elongated central opening through which the blade may be raised vertically to engage a workpiece supported on the table top;

an insert made of wood or plastic or their equivalent having a top surface and a bottom surface fitted in said central opening; and means for securing the insert within said central opening to completely cover the same such that the top surfaces of the insert, the base plate and the table top are substantially co-planar and horizontal.

2. The throat plate of claim 1 wherein the means for securing the insert comprises a dovetailed groove in the base plate straddling the central opening, the insert having angled sides for engaging said dovetailed groove.

3. The throat plate of claim 1 comprising a pair of side adjustment screws for stationary positioning of the base plate within the recessed opening, the base plate having a pair of threaded holes drilled, one hole into each of the opposite ends thereof at an angle substantially 45° from a longitudinal axis of the plate for receiving said screws, said holes being on the same side of said axis.

4. The throat plate of claim 1 wherein the insert has a slot formed therein through which the blade may be vertically projected.

5. The throat plate of claim 1 wherein the insert has a recess therein extending upwardly from said bottom surface thereof adapted to be above the saw blade in the mounted position of said throat plate to permit the throat plate to be fitted into the recessed opening in the table top with the upper portion of the periphery of said saw blade below the inner surface of said recess but above the bottom surface of said insert.

6. A method of operating a table saw having a table top surface with an elongated recessed throat plate opening, and a circular saw blade mounted to a motor, the saw blade movable vertically to project through the recessed opening above the table top surface or to be positioned below the table top surface, the method comprising:

providing a throat plate having a longitudinal axis and receivable within said throat plate opening and having a central opening for receiving an insert;

positioning an insert made of wood or equivalent material in said central opening of said throat plate;

lowering the saw blade below the table top surface;

positioning said throat plate in said throat plate opening with a top surface of the metal plate, a top surface of the insert, and the table top surface in substantially co-planar relationship;

clamping a board to the table top surface so as to overlay said insert;

applying power to said saw blade to rotate the same;

raising the saw blade upward through the recessed opening in the table top surface and the central opening in the throat plate so as to engage the insert and cut a slot therethrough as the saw blade is raised vertically to project above the table top surface;

stopping said blade; and removing the board from the table top surface.

7. The method of claim 6 wherein said throat plate opening and said throat plate are oblong with rounded ends and said throat plate comprises:

a set of two side adjustment screws located in threaded holes drilled into two opposite ends of said throat plate from the same side of and at substantially 45° angles to said longitudinal axis of said throat plate; the steps of positioning said throat plate in said throat plate opening and adjusting each side adjustment screw so as snugly to contact the adjacent wall of said throat plate opening, until said throat plate fits snugly within said throat plate opening.

* * * * *